UNITED STATES PATENT OFFICE.

EARL V. WAGNER, OF SCRANTON, PENNSYLVANIA, ASSIGNOR TO THE WAGNER FIRE BRICK COMPANY, OF HELENA, MONTANA.

PLASTIC COMPOSITION FOR MAKING PAVING-BRICK, BUILDING-BRICK, AND BUILDING-TILE.

1,193,952. Specification of Letters Patent. Patented Aug. 8, 1916.

No Drawing. Application filed January 8, 1916. Serial No. 70,984.

*To all whom it may concern:*

Be it known that I, EARL V. WAGNER, a citizen of the United States, residing at Scranton, in the county of Lackawanna and State of Pennsylvania, have invented a new and useful Plastic Composition for Making Paving-Brick, Building-Brick, and Building-Tile, of which the following is a specification.

| | |
|---|---|
| Coal ash | .99 cu. yd. |
| Crude fibrous asbestos | .01 cu. yd. |
| Water | 35 gals. |

It is not intended to confine the discovery here applied for to the use of the ingredients specified in the proportions specified, as these proportions may in some cases be advantageously varied, producing substantial identity of result.

Grind and mingle the coal ash with the crude fibrous asbestos in a mixing machine of approved type, then add the water and remix thoroughly. The plastic mass is then pressed through a pressing machine and cut to size desired by means of a cutting machine, after which it is subjected to repressure to induce proper cohesion and to destroy laminations. Remove to closed drying oven and dry for six to eight hours at a temperature of 500 to 600 degrees Fahrenheit. Remove to closed baking oven where temperature is gradually raised to 2200 to 2400 degrees Fahrenheit and bake for seven to eight days; then gradually cool when the finished product will result.

I am aware that, prior to my invention and discovery, coal ashes and asbestos fiber have been combined with lime and plaster of Paris; and with lime, plaster of Paris and alum; and with lime, plaster of Paris and marl, for the purpose of making artificial stones and plastering materials; that asbestos has been mixed with various proportions of a number of pulverulent substances such as gypsum, lime, chalk, fire clay, graphite, pumice, and ashes, for making asbestos cements and building materials; and that ashes, hydraulic cement, sand, gypsum, lime, and similar solids have been treated with a compound containing protoxid of lead, sulfate of zinc, alum, and silicate of soda, for the purpose of making artificial marbles or stones; but in these instances I am not aware that any such combinations have been burned to produce bricks. The presence of lime, plaster of Paris, cement, and similar substances having cohesive and binder properties in the compositions referred to, if subjected to the burning processes necessary to make bricks having great cohesive, crushing and tensile properties, will cause the molded masses to become incohesive or brittle and fragile or to disintegrate. On the other hand, if a small percentage of crude fibrous asbestos be added to and thoroughly mixed with finely ground coal ashes and then moistened with water, the mass thus obtained may be readily molded into bricks in the manner specified, which, when dried and burned as indicated, will result in the production of bricks lighter in weight and greater in fire resisting qualities than ordinary commercial bricks. They will also possess great crushing and tensile strength. I am not aware that the ingredients specified, in the proportions indicated, or in any other proportions, or at all, have been mixed, molded and burned to make bricks, prior to my invention and discovery thereof.

What I claim:

1. The herein described plastic composition consisting of coal ash, crude fibrous asbestos and water mixed, molded and burned, substantially as described.

2. The herein described plastic composition for making paving brick, building brick and building tile, consisting of coal ash, .99 cubic yard; crude fibrous asbestos, .01 cubic yard; water, 35 gallons mixed, molded and burned, substantially as described.

EARL V. WAGNER.

Witnesses:
HOMER C. HUTCHINS,
DAVID J. JONES.